Feb. 28, 1939.   M. J. BARTCH ET AL   2,148,524
SPRING BUMPER ARRANGEMENT ON ATTIC FANS
Filed April 15, 1937   3 Sheets-Sheet 1

INVENTORS
MAURA J. BARTCH
BY GILBERT C. POLK
ATTORNEYS

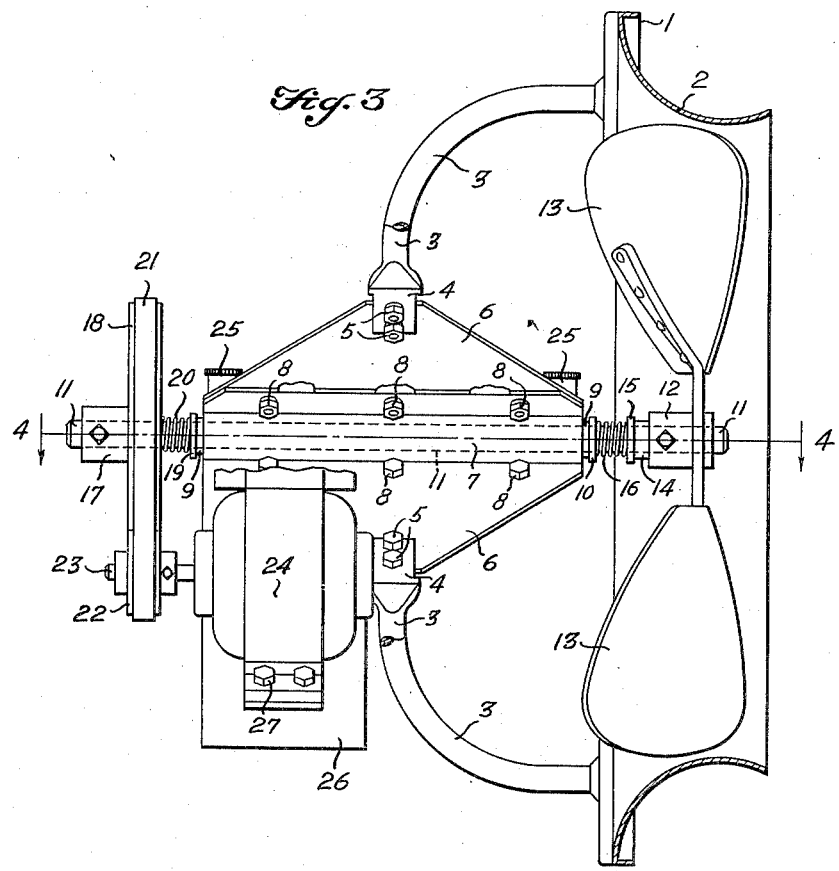
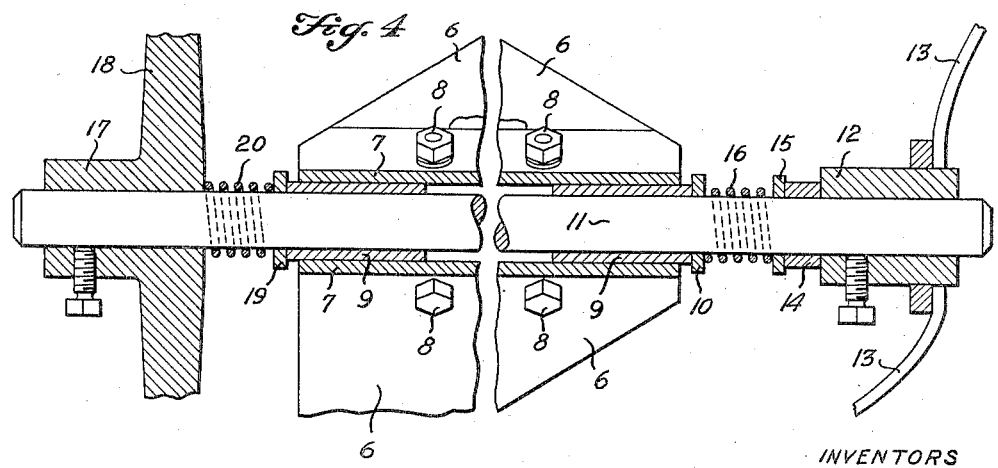

Feb. 28, 1939. M. J. BARTCH ET AL 2,148,524
SPRING BUMPER ARRANGEMENT ON ATTIC FANS
Filed April 15, 1937 3 Sheets-Sheet 3

INVENTORS
MAURA J. BARTCH
GILBERT C. POLK
BY
ATTORNEYS

Patented Feb. 28, 1939

2,148,524

UNITED STATES PATENT OFFICE 2,148,524

SPRING BUMPER ARRANGEMENT ON ATTIC FANS

Maura J. Bartch and Gilbert C. Polk, Detroit, Mich., assignors to American Blower Corporation, Detroit, Mich., a corporation of Delaware Application April 15, 1937, Serial No. 137,094

9 Claims. (Cl. 230—273)

Our invention relates to fans and in particular to means of supporting a fan shaft so as to render the fan substantially noiseless.

It is a further object to provide a means of so supporting and regulating the position of the fan shaft within its bearing as to reduce the amount of wear on the shaft, and to accommodate the shaft within its bearings due to the varying thrusts on the shaft.

It is a further object to provide means of maintaining the shaft in longitudinal alignment so as to accommodate the driving of the shaft and through the shaft, the driving of the fan, and to maintain the predetermined relationship between the fan and its Venturi throat housing to insure the maximum efficiency of the fan and its noiseless operation.

It is a further object to provide a novel form of bearing for the shaft that will align the shaft at spaced points, providing a broad bearing surface for the shaft with the minimum wear thereon.

It is a further object to provide such a bearing that can be supported from the Venturi throat, so as to maintain the lateral alignment of the fan, and so that the support through the bearing for the shaft will be between the areas of engagement of the shaft with the bearing.

Referring to the drawings:

Figure 3 is a side elevation of the fan and its support, with the Venturi housing in section, and with two of the supporting arms broken away.

Figure 4 is a section on the line 4—4 of Figure 3, showing in detail the support of the shaft within its bearings, and the arrangement of the thrust springs around the shaft and between the bearings and the fan on one side and the driving pulley on the other side.

Figure 1:
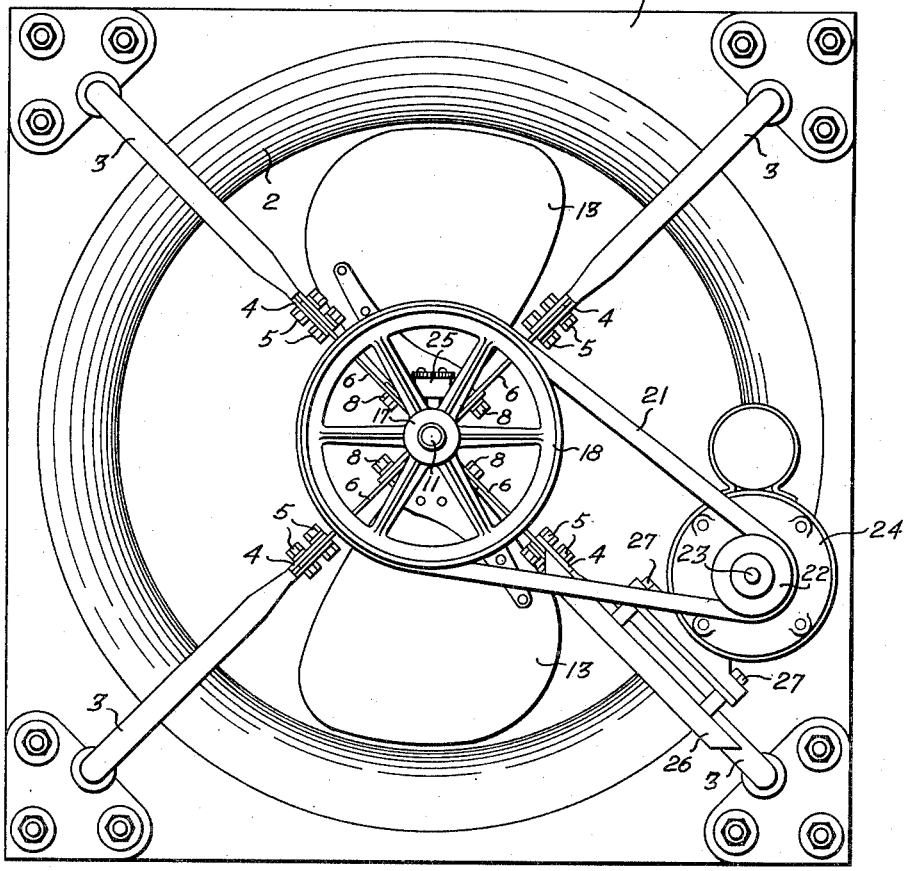
Figure 1 is a rear elevation of the fan, the Venturi housing and the means of support of the fan in the housing.
Figure 2:
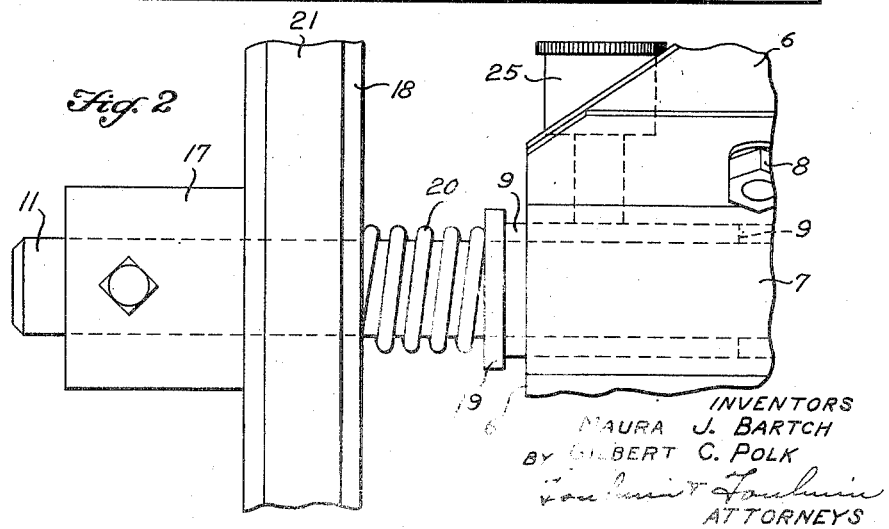
Figure 2 is a detailed elevation of one end of the shaft and one end of the exterior of the bearing support for the shaft.

Referring to the drawings in detail, 1 designates a housing or support that is provided with a Venturi throat 2. Mounted on this housing frame 1 is a plurality of rearwardly and inwardly extending arms 3 which converge towards one another. These arms are arranged at an angle of 90 degrees from one another. The inner ends of these arms are formed into clamping plates 4 through which pass the bolts 5 for engaging the bearing plate 6. Each bearing plate 6 is formed at its inner end into a quarter-cylindrical sleeve designated 7, which sleeve is attached by bolts 8 to the adjacent plate 6. The result is that a bearing support is formed of sheet metal parts, four in number, the plates 6 of which are connected to the arms 3 through the clamping plate 4. Thus there is a four-point support for the bearing plates. Within the tubular bearing support thus formed by the portions 7 of the plates 6 are bearings 9. These bearings project beyond the end of the sleeve 7 and engage with washer 10. The bearings 9 carry the fan shaft 11. On the right-hand end of this shaft is the hub 12 carrying the fan blades 13. A spacer 14 on the shaft engages with the washer 15. Between the washers 10 and 15 is interposed a helical spring 16 mounted on the shaft 11.

At the other end of the shaft 11 is mounted the hub 17 of the driven pulley or sheave 18. Between this hub 17 and the washer 19 mounted on the shaft is a second helical spring 20, mounted around the shaft. Thus the longitudinal movement of the shaft is resisted by the two springs 16 and 20. The shaft is supported in the spaced bearings 9 within the sheet metal sleeve 7 forming the bearing support. The shaft is thus maintained, with its associated parts, in alignment; its thrust is taken on the springs; the noise is absorbed by the springs; and the lateral movement of the shaft is permitted in order to reduce the wear on the shaft within the bearings at any particular point on the shafts, as an oscillatory movement is set up to a limited degree, which improves the life of the shaft and of the bearing.

The driven pulley 18 is driven by a belt 21 from a driving pulley 22 mounted on the armature shaft 23 of an electric motor 24 which is mounted on the frame 1. Grooves in the pulleys, or any other suitable or usual means may be provided to prevent the belt leaving the pulleys when the pulleys are out of alignment. Thus a self-contained unit is provided.

Suitable lubrication of the bearing sleeves 9 is provided through grease cups 25. The motor 24 can either be mounted upon a plate 26 by the bolts 27, such plate being supported from the bearing support, or the motor may be mounted upon an extension of the frame 1.

Figure 5:
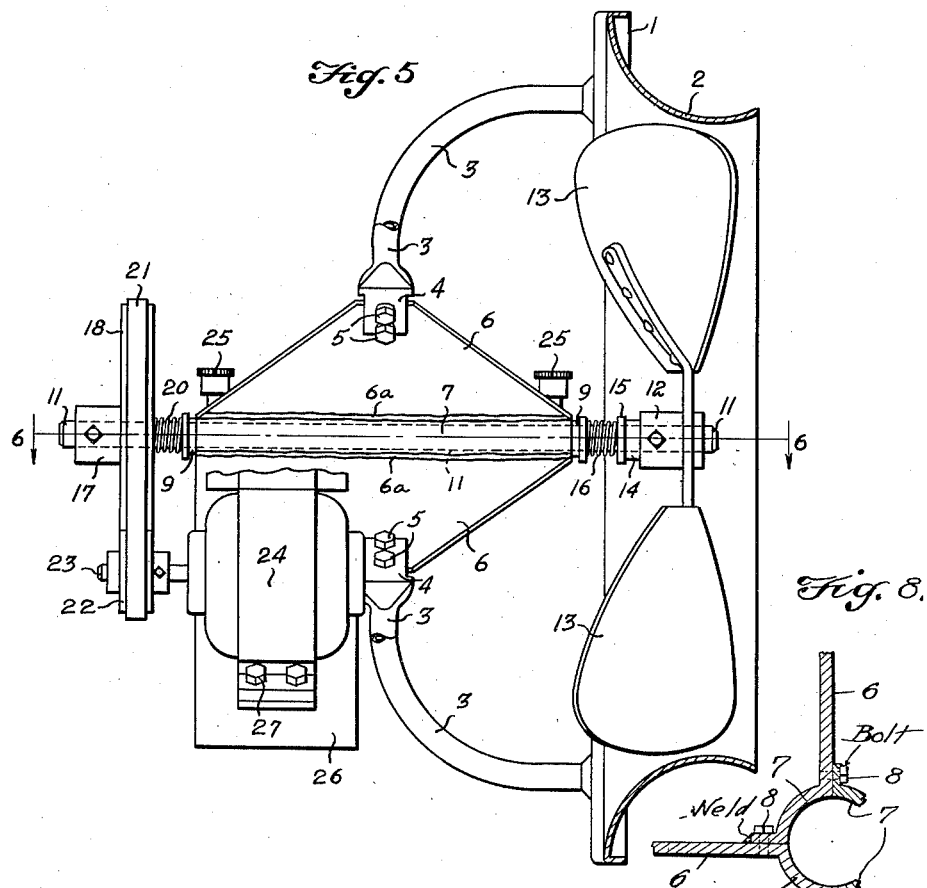
Figure 5 is a view similar to Figure 3 showing a modified form of support for the shaft.
Figure 8:
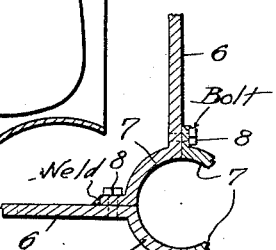
Figure 8 is a fragmentary transverse section through the bearing and plate 6, Figure 4.
Figure 6:
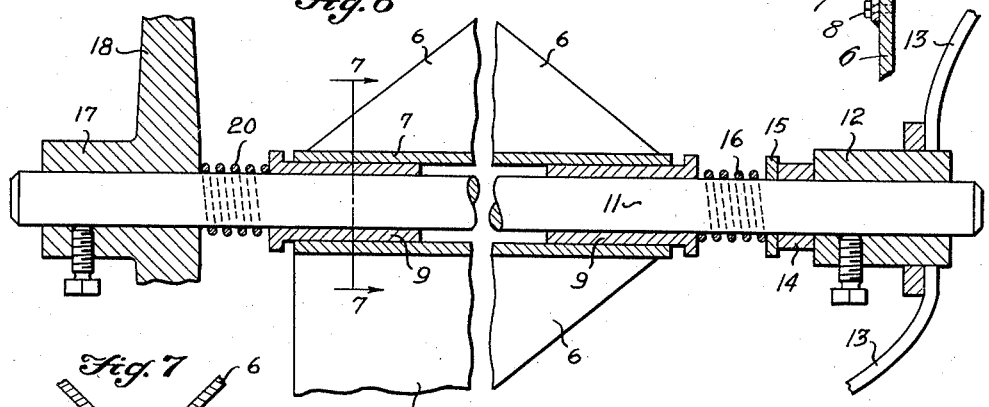
Figure 6 is a longitudinal section on the line 6—6 of Figure 5.
Figure 7:
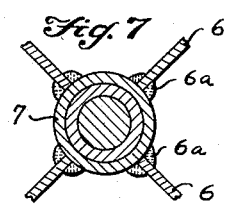
Figure 7 is a section on the line 7—7 of Figure 6 looking in the direction of the arrows.

Referring to Figures 5 to 7 inclusive, in this modification the plates 6 are welded at 6a to the bearing sleeve 7. This sleeve is a steel tube bored out at each end and the bushings 8 are pressed in place. The yielding means comprising the spring 20 may be between the bearing and the fan pulley, and the spring 16 between the bearing and the fan wheel at the other end, or a collar can be turned on the shaft 11, in which event the spring would be between this collar and the bearing.

It will be understood that we desire to comprehend within our invention such modifications as may be necessary to adapt it to varying conditions and uses.

Having thus fully described our invention, what we claim as new and desire to secure by Letters Patent, is:

1. In combination, a fan housing, laterally and inwardly extending arms mounted thereon, radiating metal plates connected to said arms respectively and to one another centrally to form a bearing sleeve; bearing means in said sleeve, a shaft in said bearing means, and a fan mounted on said shaft within said fan housing and means for driving the other end of said shaft.

2. In combination, a fan housing, laterally and inwardly extending arms mounted thereon, radiating metal plates connected to said arms respectively and to one another centrally to form a bearing sleeve; spaced bearing means in said sleeve, a shaft in said bearing means, and a fan mounted on said shaft within said fan housing and means for driving the other end of said shaft, the point of attachment of said arms to said radiating plates carrying the bearing sleeves being between said bearing means.

3. In combination, a fan housing, laterally and inwardly extending arms mounted thereon, radiating metal plates connected to said arms respectively and to one another centrally to form a bearing sleeve; bearing means in said sleeve, a shaft subject to longitudinal movement in said bearing means, a fan mounted on said shaft within said fan housing and means for driving the other end of said shaft, the point of attachment of said arms to said radiating plates carrying the bearing sleeves being between said bearing means, and yielding means between said fan and said bearing means for yieldingly limiting the longitudinal movement of said shaft and said fan.

4. In combination, a fan housing, a fan within said housing, a shaft therefor subject to longitudinal movement, bearings for said shaft, means of supporting said bearings comprising a bearing sleeve formed of the inner ends of a plurality of radiating metal plates, and arms mounted on said fan housing adapted to support said metal plates, constructed and arranged so that the fan shaft is resiliently supported, and resilient means between said bearing means and said fan for yieldingly resisting the longitudinal movement of said shaft.

5. In combination, a fan housing, a fan within said housing, a shaft therefor subject to longitudinal movement, bearings for said shaft, means of supporting said bearings comprising a bearing sleeve formed of the inner ends of a plurality of radiating metal plates, arms mounted on said fan housing adapted to support said metal plates, of such nature that the fan shaft is resiliently supported, resilient means between said bearing means and said fan for yieldingly resisting the lateral longitudinal movement of said shaft, an additional yielding means between the other of said bearing means and the other end of said shaft, and means on said other end of the shaft adapted to drive the shaft and the fan.

6. In combination, a fan housing, a fan within said housing, a shaft therefore subject to longitudinal movement, bearings for said shaft, means of supporting said bearings comprising a bearing sleeve formed of the inner ends of a plurality of radiating metal plates, arms mounted on said fan housing adapted to support said metal plates, said parts being constructed and arranged so that the fan shaft is resiliently supported, resilient means between said bearing means and said fan for yieldingly resisting the longitudinal movement of said shaft, an additional yielding means between the other of said bearing means and the other end of said shaft, means on said other end of the shaft adapted to drive the shaft and the fan, and means of mounting said driving means on the bearing supporting means.

7. In combination, a shaft subject to longitudinal movement, spaced bearings, a plurality of equi-distantly spaced radiating sheet metal plates having inner ends interconnected and formed into an arcuate bearing support, means to detachably connect said inner ends of said sheet metal plates, a fan housing a fan therein, equi-distantly spaced arms extending rearwardly and inwardly to the outer ends of said sheet metal plates, helical springs mounted on said shaft on the outside of said bearings, and means on said shaft on either end to engage with the outer ends of said helical springs, said parts being constructed and arranged so that the longitudinal movement of said shaft is yieldingly resisted in opposite directions.

8. In combination, a shaft supported for longitudinal movement, spaced bearings, a plurality of equi-distantly spaced radiating sheet metal plates having inner ends interconnected and formed into an arcuate bearing support, means to detachably connect said inner ends of said sheet metal plates, a fan housing, a fan therein equi-distantly spaced arms extending rearwardly and inwardly to the outer ends of said sheet metal plates, helical springs mounted on said shaft on the outside of said bearings, means on said shaft on either end to engage with the outer ends of said helical springs, the parts being constructed and arranged so that the longitudinal movement of said shaft is yieldingly resisted in opposite directions, and means for lubricating said bearings.

9. In combination, a shaft subject to longitudinal movement, spaced bearings, a plurality of equi-distantly spaced radiating sheet metal plates having inner ends interconnected and formed into an arcuate bearing support, means to detachably connect said inner ends of said sheet metal plates, a fan housing, a fan therein, equi-distantly spaced arms extending rearwardly and inwardly to the outer ends of said sheet metal plates, helical springs mounted on said shaft on the outside of said bearings, means on said shaft on either end to engage with the outer ends of said helical springs, the parts being constructed and arranged so that the longitudinal movement of said shaft is yieldingly resisted in opposite directions, a motor mounted on one of said arms and means connecting said motor to said shaft for driving said shaft.

MAURA J. BARTCH.
GILBERT C. POLK.